US010075383B2

(12) United States Patent
Jiang et al.

(10) Patent No.: US 10,075,383 B2
(45) Date of Patent: Sep. 11, 2018

(54) SELF-TIMED ROUTER WITH VIRTUAL CHANNEL CONTROL (71) Applicant: Advanced Micro Devices, Inc., Sunnyvale, CA (US)

(72) Inventors: Weiwei Jiang, New York, NY (US); Greg Sadowski, Cambridge, MA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 145 days.

(21) Appl. No.: 15/085,783

(22) Filed: Mar. 30, 2016

(65) Prior Publication Data
US 2017/0289057 A1   Oct. 5, 2017

(51) Int. Cl.
*H04L 12/873* (2013.01)

(52) U.S. Cl.
CPC .................. *H04L 47/527* (2013.01)

(58) Field of Classification Search
CPC . H04L 41/0889; H04L 45/302; H04L 45/586; H04L 49/109; H04L 12/5601; H04L 2012/5621; H04L 2012/5624; H04L 47/621; H04L 49/3081; H04L 49/309
USPC .......................................................... 370/397
See application file for complete search history.

(56) References Cited

U.S. PATENT DOCUMENTS

| 6,715,055 | B1* | 3/2004 | Hughes | H04L 47/11 709/238 |
|---|---|---|---|---|
| 6,938,094 | B1 | 8/2005 | Keller et al. | |
| 6,950,438 | B1 | 9/2005 | Owen et al. | |
| 7,295,563 | B2* | 11/2007 | Hughes | H04L 45/10 370/235 |
| 9,015,448 | B2 | 4/2015 | Krishna et al. | |
| 2003/0152091 | A1* | 8/2003 | Gusat | H04L 47/10 370/401 |
| 2007/0133415 | A1* | 6/2007 | Spink | H04L 47/10 370/235 |
| 2008/0123679 | A1* | 5/2008 | Scott | G06F 11/0781 370/422 |
| 2008/0144670 | A1* | 6/2008 | Goossens | G06F 15/78 370/503 |

(Continued)

OTHER PUBLICATIONS

Keller, et al., U.S. Appl. No. 09/398,624, entitled "Response Virtual Channel for Handling All Responses", filed Sep. 17, 1999, 87 pages.

*Primary Examiner* — Robert Lopata
(74) *Attorney, Agent, or Firm* — Meyertons Hood Kivlin Kowert and Goetzel PC; Rory D. Rankin (57) ABSTRACT Systems, apparatuses, and methods for implementing an asynchronous router with virtual channel (VC) control. The asynchronous router may support multiple VCs for connections to other routers. The asynchronous router may include an interface unit on each switch boundary, with each interface unit including a data merge unit. The data merge unit may include a full detector unit for each VC, with the full detector unit counting the number of flits sent out on a respective VC and counting the number of credits released by the successor router. Whenever the successor router has no credits available, the full detector unit will assert the full signal to prevent any input requests from requesting to transmit over that particular VC. When the full signal is asserted, a timer unit may be activated to repeatedly check if any credits have been released in the successor router.

17 Claims, 11 Drawing Sheets (56) References Cited

U.S. PATENT DOCUMENTS

| | | | |
|---|---|---|---|
| 2009/0055496 A1* | 2/2009 | Garg | H04L 47/10 709/206 |
| 2010/0014535 A1* | 1/2010 | Sherman | H04L 47/621 370/409 |
| 2012/0144064 A1* | 6/2012 | Parker | H04L 45/04 709/241 |
| 2013/0031412 A1* | 1/2013 | Iwasaki | H04L 43/50 714/32 |
| 2013/0051397 A1* | 2/2013 | Guo | H04L 45/00 370/400 |
| 2014/0192819 A1* | 7/2014 | Nishimura | H04L 47/527 370/412 |
| 2016/0182391 A1* | 6/2016 | Theobald | H04L 12/4641 370/230 |
| 2016/0344629 A1* | 11/2016 | Gray | H04L 45/60 |
| 2017/0063625 A1* | 3/2017 | Philip | H04L 41/0889 |
| 2017/0244638 A1* | 8/2017 | Hirota | H04L 47/12 |
| 2017/0272370 A1* | 9/2017 | Ganga | H04L 47/2441 |

\* cited by examiner

SELF-TIMED ROUTER WITH VIRTUAL CHANNEL CONTROL

The invention described herein was made with government support under contract number DE-AC52-07NA27344 awarded by the United States Department of Energy. The United States Government has certain rights in the invention.

BACKGROUND

Technical Field

Embodiments described herein relate to computing devices and, more particularly, to network communication.

Description of the Related Art

Asynchronous (or self-timed) circuits may be incorporated into computing systems and devices for performing various operations. In contrast to synchronous circuits which use global clocks to control the functioning of the circuits, asynchronous circuit components do not rely on such a reference signal (e.g., global clock) to stay synchronized with other components. Rather, asynchronous circuits generally utilize other signals to indicate if and when actions are to be taken. As such, asynchronous circuits may have multiple components which synchronize packets at their own rate.

When transmitting messages in a computing system (e.g., network, or otherwise), the messages may be broken up into one or more packets before transmission. Each of these packets typically includes a header and a payload. These packets may in turn be broken up into smaller pieces or units. In various embodiments, these smaller packet pieces may be referred to as flow control units/digits, or "flits". In various embodiments, the first flit of a packet may be at least a portion of a packet header ("head flit") that includes information about the packet's route (e.g., the destination address). Additionally, the head flit may include information that sets up the routing behavior for subsequent flits of the packet. The head flit may be followed by one or more body flits which contain the actual payload of data. The final flit of a packet, which may be referred to as a "tail flit", may be used to close a connection between two routers.

Asynchronous components can offer significant advantages over traditional clocked circuits in a variety of applications, including Network-on-chip (NoC) applications. Typically, an NoC interconnects components of a computing system (e.g., processors, memory elements, etc.) and provide a means of communication between these components. The self-timed nature of the NoC simplifies the design of the NoC and may improve both performance and power consumption. One important function of an NoC is to properly route packets. Often a router circuit is included in the NoC that performs this function and directs packets of information as needed. With the increasing complexity of circuits, it may be difficult to achieve the desired power and timing characteristics when using synchronous circuits. Consequently, asynchronous circuits that can offer advantages in performance, power consumption, and/or scalability may be seen as a desirable option.

SUMMARY

Systems, apparatuses, and methods for implementing an asynchronous router with virtual channel control are contemplated.

In one embodiment, an asynchronous router may support multiple virtual channels (VCs) for connections to other routers or compute/memory nodes. In one embodiment, the router may include five input ports and five output ports. In other embodiments, the router may include other numbers of input and output ports. The router may include a switch for each VC supported by the router. Any number of VCs may be supported by the router, depending on the embodiment. The router may also include an interface unit on the switch boundary between the switches and other routers or nodes.

In one embodiment, each interface unit may include a data demultiplexer (demux) unit and a data merge unit. The data demux unit may support one data input channel, and the data demux unit may support one data output channel for each VC. For an embodiment with two VCs, the data demux unit may support two data output channels. The data demux unit may also include a latch control unit for each VC. When a packet arrives at the data demux unit from a neighboring router or node, one of the latch control units may be activated, depending on the VC ID information in the header of the packet. The activated latch control unit may open a corresponding data register, and the data may be sent to the selected output through the data register. As soon as the data is sent out, the data register may be closed for data protection.

The data merge unit may support one data output channel, and the data merge unit may support one data input channel for each VC. For an embodiment with two VCs, the data merge unit may support two data input channels. The data merge unit may receive credit increment signals for each VC from the successor router to indicate that data has been absorbed by the successor router. The data merge unit may include a mutual exclusion element (or mutex), and the data merge unit may include a separate mutex input control unit for each VC. The mutex input control units and mutex may arbitrate between the input requests received on the data input channels. The winner of arbitration will be allowed to transfer data to the output first, and the loser of arbitration will be next. The data merge unit may include input latches which are normally opaque and which will only be open one at a time after the mutex selects the winner. The data merge unit may include output latches which are normally transparent and are used for flow control.

The data merge unit may also include a full detector unit for each VC, with each full detector unit counting the number of flow control units/digits (flits) sent out on the corresponding VC, and with each full detector unit also counting the number of credits released by a successor router. Whenever the successor router has no credits available, the full detector unit will assert a full indicator to prevent any input requests from requesting the mutex for that particular VC. When the full indicator is asserted, a corresponding timer may be activated to repeatedly check if any credits have been released in the successor router. When credits are again available, the full indicator may be de-asserted, and the router may return to normal operation.

The full detector unit may include two counters for each VC. The first counter may count the number of flits sent out on the VC, and the second counter may count the number of credits released by the successor router. The first counter may be incremented whenever a data request wins arbitration and a flit is sent out to the successor router on the corresponding VC. The second counter may be incremented whenever a flit leaves the input buffer in the successor router. The full detector unit may also include a comparator which compares the two counters and detects if the input buffer in the next router is potentially full. The comparison may occur each time the first counter is updated but not when the second counter is updated. The full detector unit may also include a synchronizer to synchronize the second counter with the first counter.

These and other features and advantages will become apparent to those of ordinary skill in the art in view of the following detailed descriptions of the approaches presented herein.

BRIEF DESCRIPTION OF THE DRAWINGS

The above and further advantages of the methods and mechanisms may be better understood by referring to the following description in conjunction with the accompanying drawings, in which.

DETAILED DESCRIPTION OF EMBODIMENTS

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Figure 1:
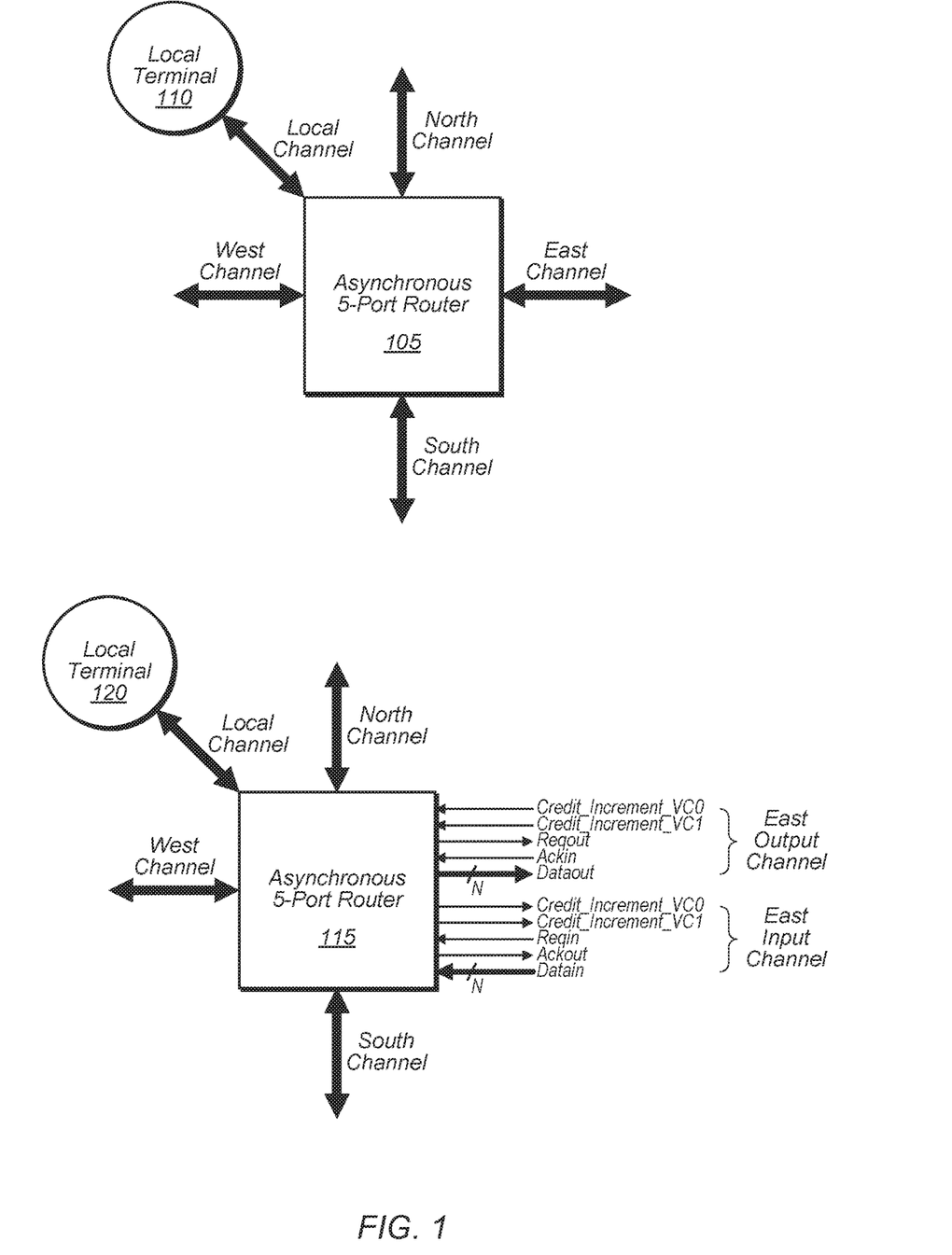
FIG. 1 illustrates block diagrams of embodiments of two routers.

Referring now to FIG. 1, block diagrams illustrating embodiments of routers 105 and 115 are shown. Router 105 may have a standard structure for 2D-mesh topology for connecting to a plurality of routers and local terminal 110. The structure of router 105 can be easily extended to any higher-radix routers or lower-radix routers. The East, West, North and South bi-directional channels may be connected to neighboring routers or nodes, and the local channel may be connected to a local terminal 110, which can be a computational core, memory element, or other device. Multiple VCs can be multiplexed on any of the individual physical channels shown for router 105. VCs can be used to make packet switching more flexible, to increase performance by reducing the blockage of links, and to avoid deadlock.

In one embodiment, the communication channels may use a transition-signaling protocol (i.e., 2-phase Non-Return-to-Zero) with a single-rail bundled data encoding scheme. In a 2-phase communication protocol, each transaction may contain only one round-trip communication between two routers, which maximizes the throughput. On the other hand, single-rail bundled data encoding replaces commonly-used high-cost, delay-insensitive channels for low area and energy cost.

Router 115 is shown at the bottom of FIG. 1, and router 115 may be coupled to local terminal 120 via the local channel. One example of channel instantiation is illustrated for the east channel of router 115. The other channels of router 115 may have a similar channel instantiation as is shown for the east channel. As shown for the east output channel, there may be two credit increment input signals, Credit_Increment_VC0 and Credit_Increment_VC1. Credit_Increment_VC0 may be asserted (i.e., driven to a logical '1') when a credit has been released by the successor router or node on virtual channel (VC) 0, which may occur when a flit leaves the input buffer in the successor router or node. Similarly, Credit_Increment_VC1 may be asserted when a credit has been released by the successor router or node on VC 1. Ackin is an acknowledgment from the successor router that the successor router has received a flit. Dataout is the data output of a flit and Reqout indicates a request to send data on the Dataout channel. The width of the data output may be 'N' bits, with 'N' varying from embodiment to embodiment, and with 'N' being any positive integer.

On the east input channel, Credit_Increment_VC0 may be used to indicate when a credit has been released by the router 115 on VC 0. Credit_Increment_VC0 may be asserted when a flit leaves the input buffer in the router 115. Credit_Increment_VC1 may be used to indicate when a credit has been released by the router 115 on VC 1. Datain may be the data input of a flit from the adjacent router or node, with Reqin indicating a request to send data on the Datain channel. Ackout may be generated by router 115 when router 115 has received a flit from the adjacent router or node.

Each packet may include a tag that identifies which VC should handle the packet. Packets are often broken into smaller units called flow control units ("flits"), and the flits of a packet may be sent in sequence. Typically, one flit is sent per clock cycle. The actual size of a flit may vary depending on network parameters or other characteristics. In one embodiment, one flit may correspond to one "credit" used in flow control and a flit may be a fraction of the size of a VC buffer. As used herein, the term "credit" may generally refer to an indication of resource availability (e.g., buffer space) or authorization to take some action. For example, one credit may indicate the availability of one resource or authorization to take one action (e.g., initiate a transaction, etc.). Similarly, two credits may indicate the availability of two resources or authorization to take two actions, and so on. Various indicators or signals may be communicated between devices to indicate such availability (or authorization) or lack thereof. For example, a downstream router may convey an indication to an upstream router that a resource such as buffer space in the downstream router is available for use by the upstream router. The downstream router may convey such an indication when space in an input buffer of the downstream router has been freed. The upstream router receiving the indication may keep a count of such availability/authorizations (credits) so that it can determine when it may convey data to the downstream router for storage in the buffer. When the upstream router conveys such data, it may then decrement its credit count to indicate availability of the resource (or authorization to take an action) has been reduced. These and other embodiments for managing credits are possible and are contemplated. A downstream router may also be referred to as a successor router. A successor router in a given context generally refers to a router which is directly coupled to the upstream router, with the successor router the target of a flit being transmitted from the upstream router. In other words, when considering the transmission of a packet from router A to router B, the successor router is router B. For a subsequent transmission of a different packet from router A to router C, the successor router is router C.

Figure 2:
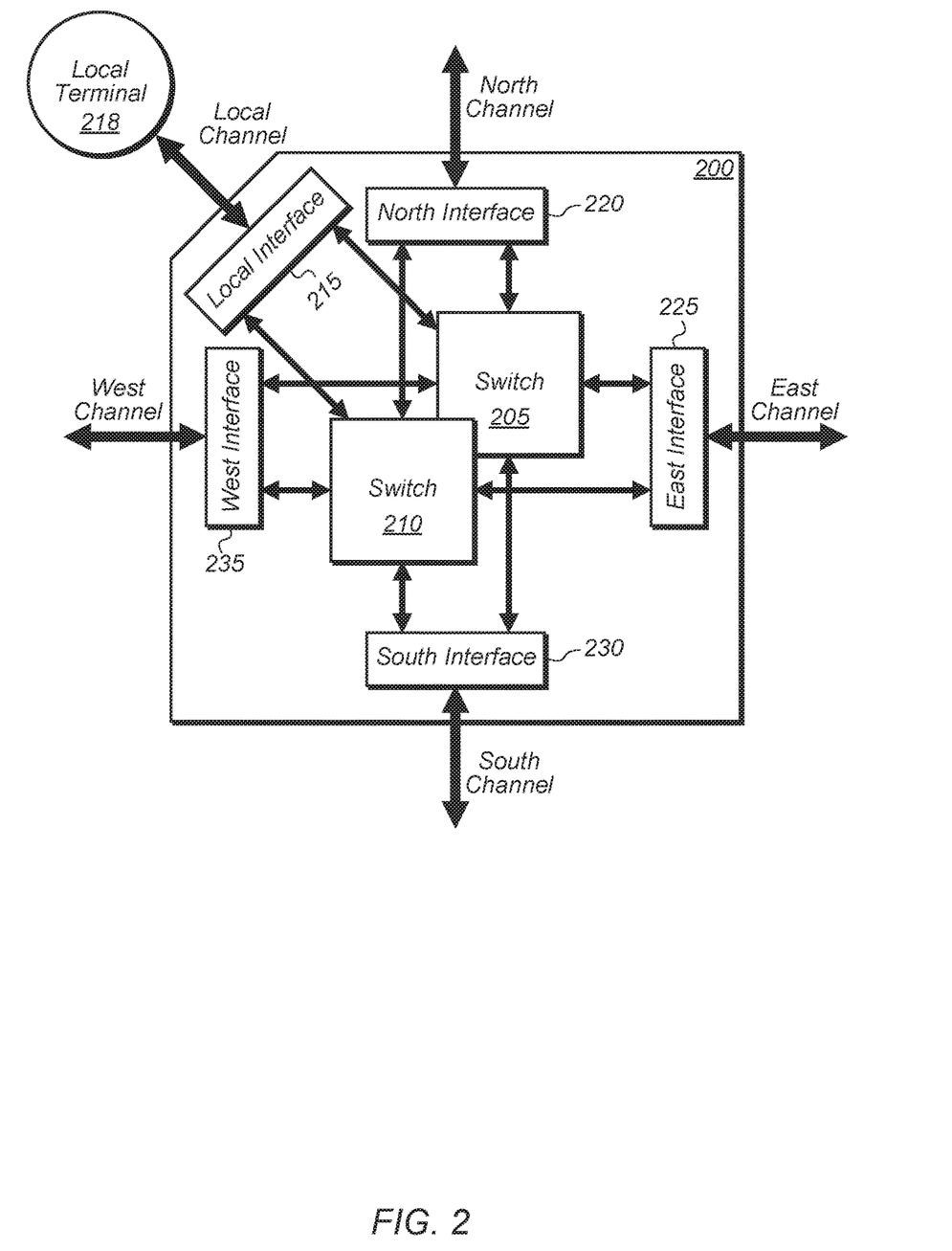
FIG. 2 is a block diagram of another embodiment of a router.

Turning now to FIG. 2, a block diagram of another embodiment of a router 200 is shown. Router 200 may utilize a multi-switch approach to support a multiple VC implementation. In particular, the switch may be duplicated as many times as the intended number of VCs. In this example shown in FIG. 2, router 200 supports two VCs, but the structure of router 200 may be extended to any number of VCs.

Router 200 may include switch 205 and switch 210 to support two VCs. Router 200 may also include local interface 215 coupled to a local terminal 218 via a local channel. Router 200 may also include north interface 220 to couple to another router or node via a north channel, east interface 225 to couple to another router or node via an east channel, south interface 230 to couple to another router or node via a south channel, and west interface 235 to couple to another router or node via a west channel.

Figure 3:
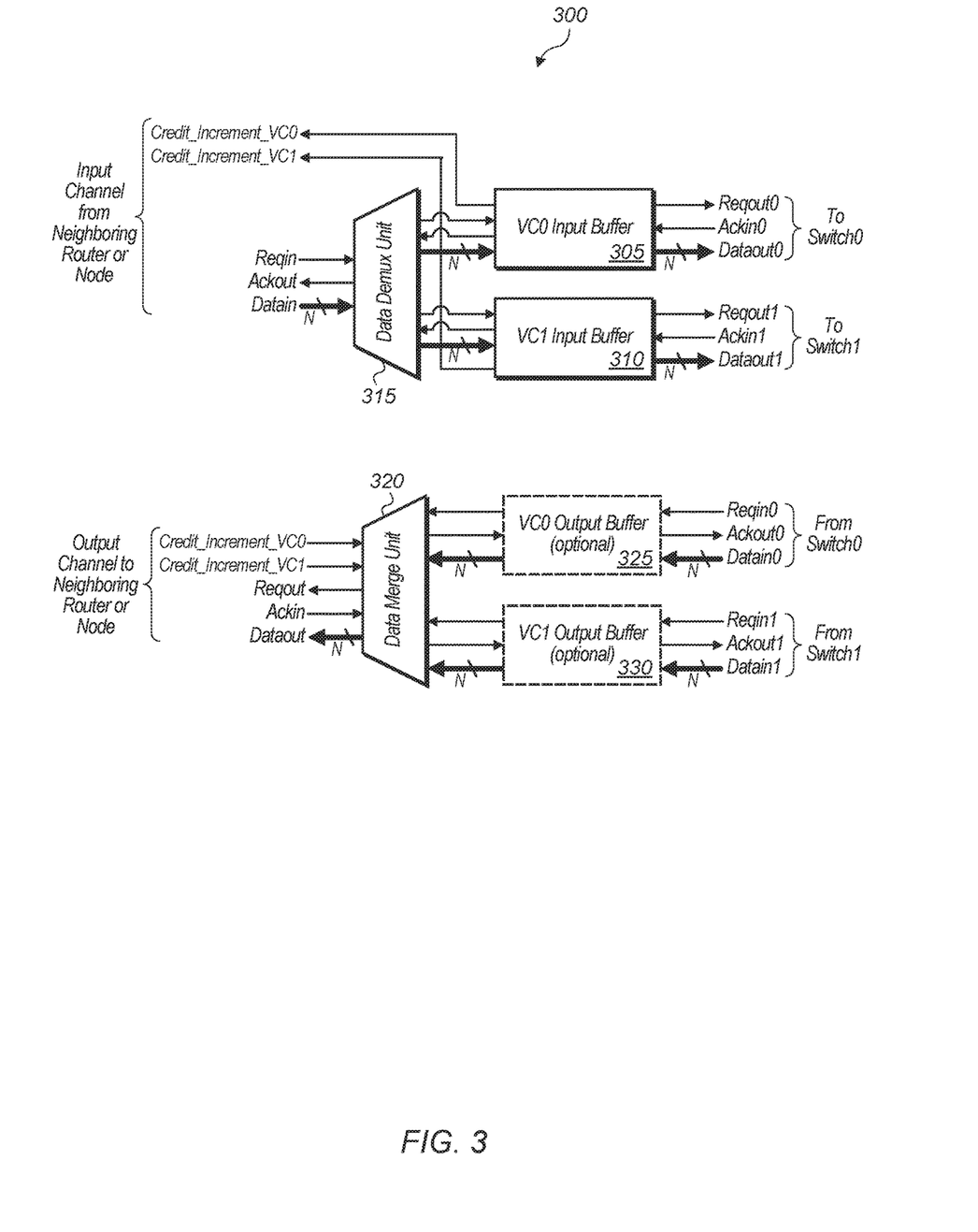
FIG. 3 is a block diagram of one embodiment of an interface unit for implementation in a router.

Referring now to FIG. 3, a block diagram of one embodiment of an interface unit 300 for implementation in a router is shown. The components of interface unit 300 may be utilized in one or more of interfaces 215, 220, 225, 230, or 235 of FIG. 2. Interface unit 300 may include VC0 input buffer 305 and VC1 input buffer 310 for receiving input data and signals on VC 0 and VC 1, respectively, from a neighboring router. VC0 input buffer 305 and VC1 input buffer 310 may be coupled to data demultiplexer (demux) unit 315. VC0 input buffer 305 may be coupled to a first switch (Switch0) of the host router and VC1 input buffer 310 may be coupled to a second switch (Switch1) of the host router.

The input signals to VC0 input buffer 305 may include Ackin0 from the first switch and Reqin and Datain from the neighboring router or node (not shown) via data demux unit 315. The data width of Datain is shown as 'N', which may vary from embodiment to embodiment, and which may be any positive integer. The output signals of VC0 input buffer 305 may include Ackout and Credit_Increment_VC0 to the neighboring router or node and Reqout0 and Dataout0 to the first switch of the host router. Similarly, the input signals to VC1 input buffer 310 may include Ackin1 from the second switch and Reqin and Datain from the neighboring router or node via data demux unit 315. The output signals of VC1 input buffer 310 may include Ackout and Credit_Increment_VC1 to the neighboring router or node and Reqout1 and Dataout1 to the second switch of the host router.

Data demux unit 315 may be coupled to the neighboring router or node and to VC0 input buffer 305 and VC1 input buffer 310. Data demux unit 315 may couple Reqin and Datain (received from the neighboring router or node) to either VC0 input buffer 305 or VC1 input buffer 310 depending on the VC indicated in the header of the packet. Data demux unit 315 may also receive Ackout signals from both VC0 input buffer 305 and VC1 input buffer 310 and convey a single Ackout signal to the neighboring router or node.

Data merge unit 320 may be coupled to a neighboring router or node on the output channel, and data merge unit 320 may optionally be coupled to VC0 output buffer 325 and VC1 output buffer 330. In another embodiment, interface unit 300 may omit VC0 output buffer 325 and VC1 output buffer 330 and the Reqin0, Ackout0, Datain0, Reqin1, Ackout1, and Datain1 signals may be coupled directly from the switches to data merge unit 320.

VC0 output buffer 325 may receive Reqin0 and Datain0 signals from the first switch of the host router. VC0 output buffer 325 may convey the Reqin0 and Datain0 signals to data merge unit 320, and VC0 output buffer 325 may receive the Ackout0 signal from data merge unit 320 and convey the Ackout0 signal to the first switch. Similarly, VC1 output buffer 330 may receive Reqin1 and Datain1 signals from the second switch of the host router. Also, VC1 output buffer 330 may convey the Reqin1 and Datain1 signals to data merge unit 320, and VC1 output buffer 330 may receive the Ackout1 signal from data merge unit 320 and convey the Ackout1 signal to the first switch.

Data merge unit 320 may be coupled to the neighboring router or node on the output channel, and data merge unit 320 may receive the Credit_Increment_VC0 and Credit_Increment_VC1 signals and the Ackin signal from the neighboring router or node. Data merge unit 320 may select which of pair of signals (Reqin0 and Datain0 or Reqin1 and Datain1) to convey to the neighboring router or node.

Figure 4:
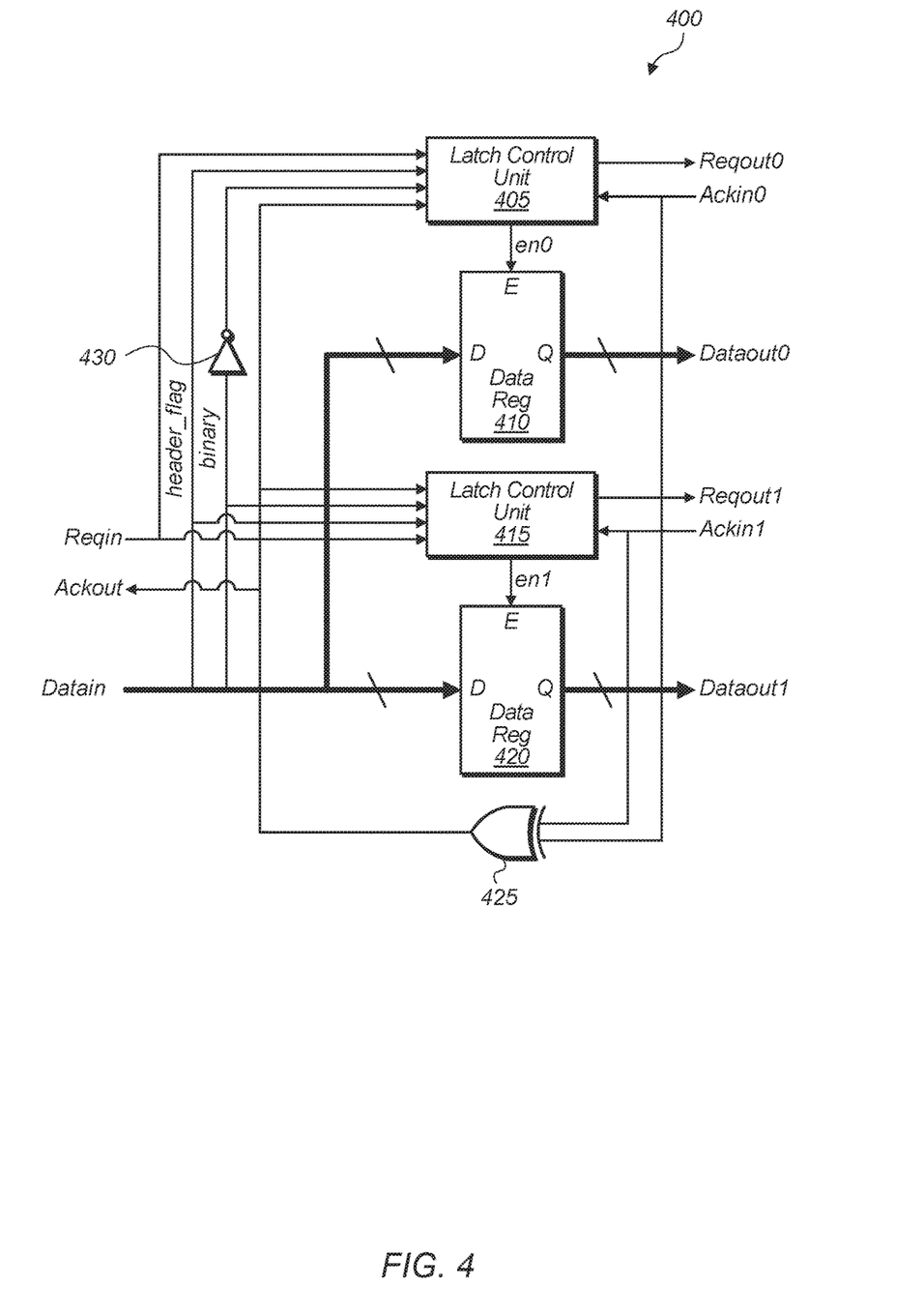
FIG. 4 is a block diagram of one embodiment of a data demux unit.

Turning now to FIG. 4, a block diagram of one embodiment of a data demux unit 400 is shown. In one embodiment, data demux unit 400 may support one data input channel and two data output channels. In other embodiments, data demux unit 400 may support other numbers of data output channels. Data demux unit 400 may include latch control units 405 and 415, registers 410 and 420, XOR-gate 425, and inverter 430. In other embodiments, data demux unit 400 may include other components and/or may be structured differently.

Initially, both latch control units 405 and 415 may be inactivated, and both data registers 410 and 420 may be default opaque and demand-opening. In one embodiment, registers 410 and 420 may be level-sensitive D-type transparent latch registers. When a packet arrives, with its header flit first, exactly one of the latch control units 405 or 415 will be activated, depending on the binary information (i.e., VC ID information) in the header. As a consequence, the corresponding data register 410 or 420 will be opened by the activated latch control unit. The data will be sent through to a selected output along with the output request 'Reqout' signal (Reqout0 or Reqout1). As soon as the data is sent out, the corresponding register 410 or 420 will be closed for data protection. Then, after the header is absorbed by the input buffer, an acknowledgment on the corresponding channel will arrive from the input buffer and be sent as the 'Ackout' signal to the neighboring router or node. The same operation may be repeated for the following body and tail flits. The 'select' signal will remain asserted for the entire packet, and all of these packets will be transferred to the same VC input buffer as the header.

Each latch control unit 405 and 415 may generate the enable signal (en0 and en1) for the corresponding register 410 and 420. The acknowledgment input signals from the two channels may be coupled to inputs of XOR-gate 425, and the output of XOR-gate 425 may be coupled to latch control units 405 and 415 and conveyed as the "Ackout" signal to the neighboring router. The header flag and binary information (i.e., VC ID) in the Datain signal may be coupled to latch control units 405 and 415, with the binary information inverted by inverter 430 prior to being coupled as an input to latch control unit 405. The Reqin signal may also be coupled to both latch control units 405 and 415.

Figure 5:
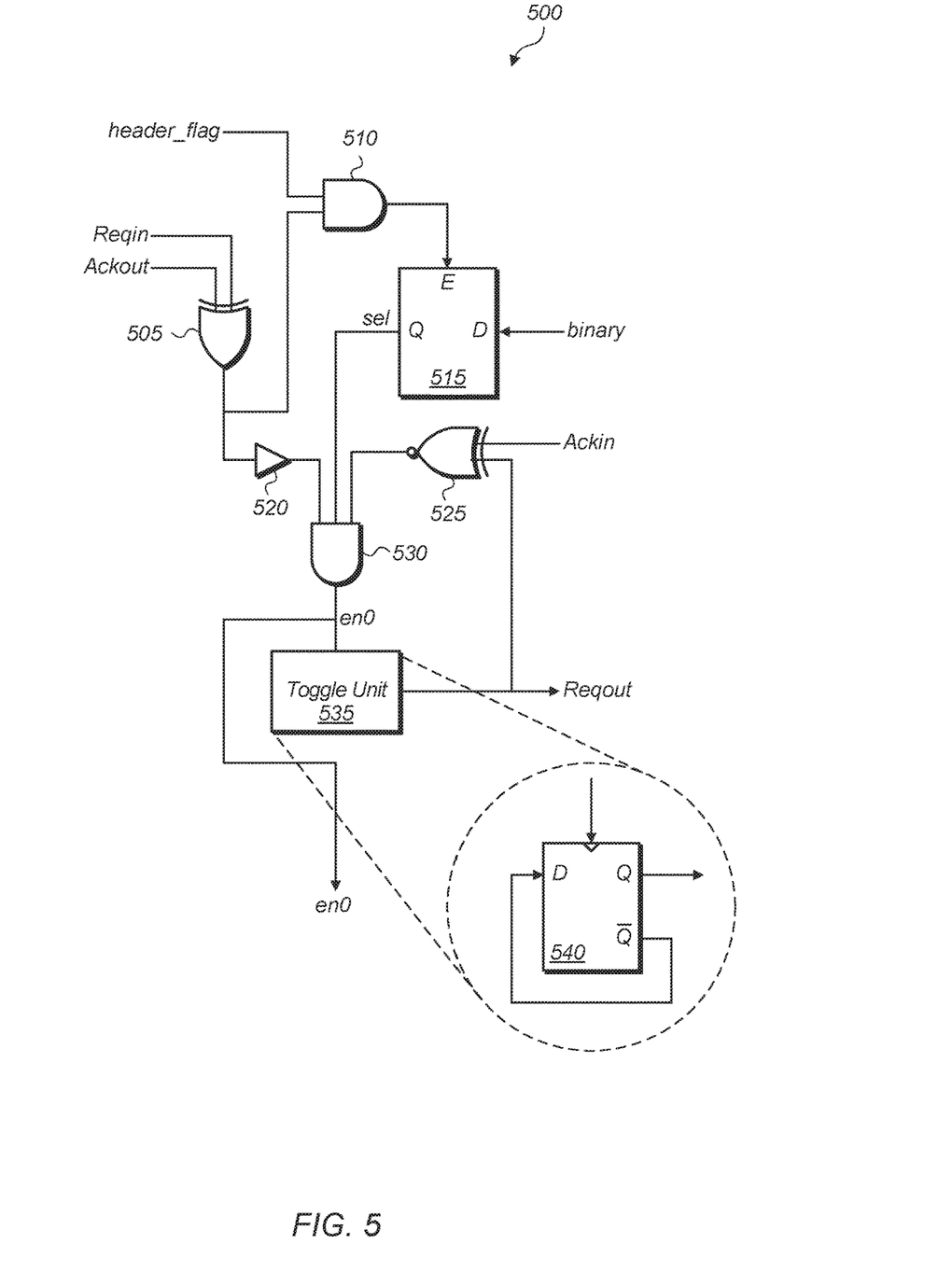
FIG. 5 is a block diagram of one embodiment of a latch control unit.

Referring now to FIG. 5, a block diagram of one embodiment of a latch control unit 500 is shown. In one embodiment, the logic of latch control unit 500 may be included within latch control units 405 and 415 of FIG. 4. Latch control unit 500 may include various components including XOR-gate 505, AND-gate 510, latch 515, delay element 520, XNOR-gate 525, AND-gate 530, and toggle unit 535. Toggle unit 535 may include the D-type flip-flop 540. The D-type flip-flop 540 may have two outputs Q and Q', with Q' the negated output of Q.

The Reqin and Ackout signals may be coupled to XOR-gate 505, with the output of XOR-gate 505 coupled to an input of AND-gate 510 and through delay element 520 to an input of AND-gate 530. The header_flag value may be coupled to another input of AND-gate 510, with the output of AND-gate 510 coupled to the enable input of latch 515. The binary value (i.e., VC ID) may be coupled to the D input of latch 515, and the Q output of latch 515, which is labeled the "sel" (or select) signal, may be coupled to an input of AND-gate 530. The Ackin signal for the corresponding VC may be coupled to an input of XNOR-gate 525, and the Q output of D-type flip-flop 540 may be coupled to the other input of XNOR-gate 525. The Q output of D-type flip-flop 540 is also the Reqout signal for the corresponding VC. The output of XNOR-gate 525 may be coupled to another input of AND-gate 530. The output of AND-gate 530, which is labeled "en0", may be coupled to toggle unit 535 and utilized as the clock input to D-type flip-flop 540. The output of AND-gate 530 may also be coupled to the enable input of a corresponding data register (e.g., data register 410 of FIG. 4).

Figure 6:
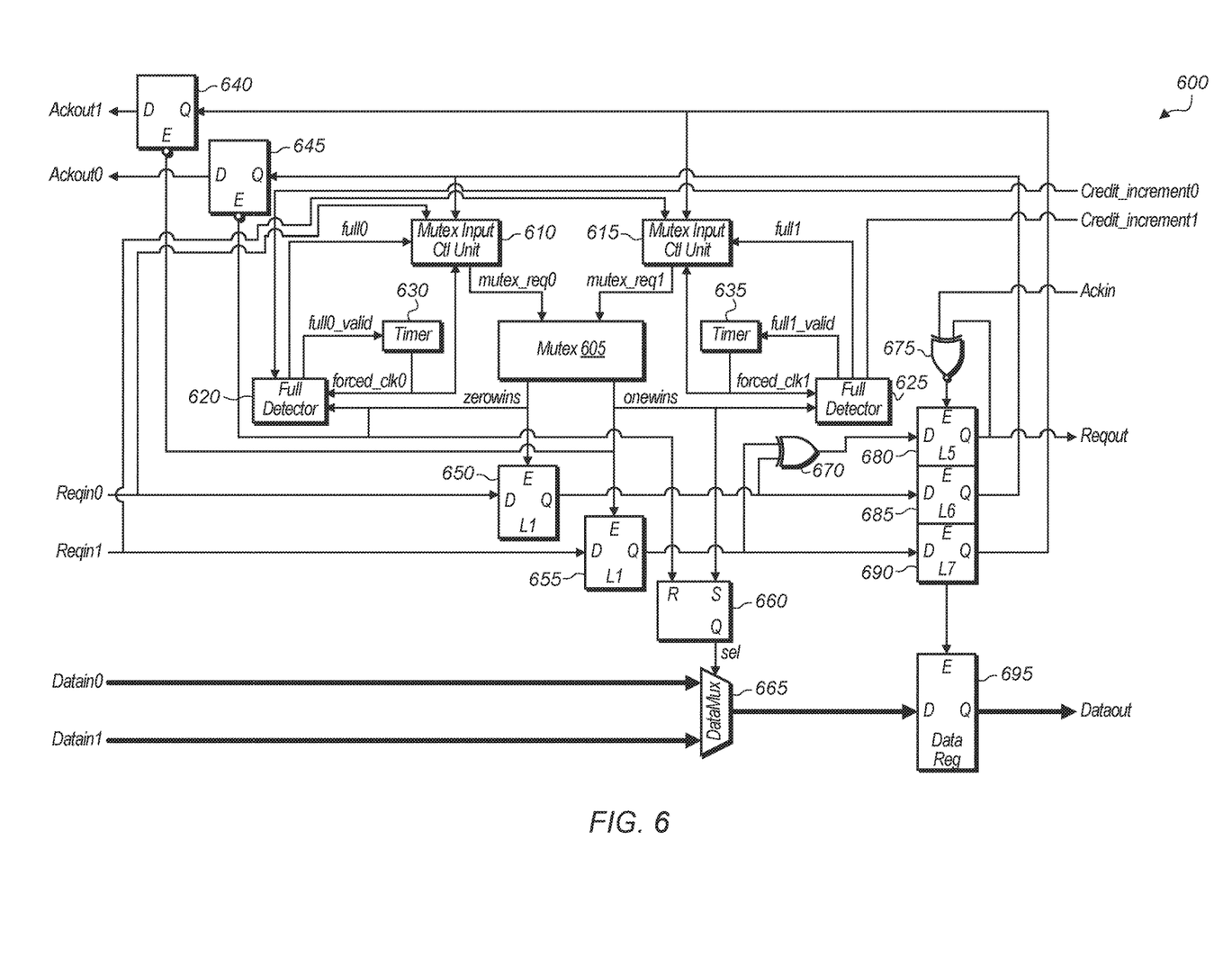
FIG. 6 is a block diagram of one embodiment of a data merge unit.

Turning now to FIG. 6, a block diagram of one embodiment of a data merge unit 600 is shown. Data merge unit 600 may include mutual exclusive element (or mutex) 605, mutex input control units 610 and 615, full detector units 620 and 625, timer units 630 and 635, latches 640, 645, 650, and 655, Set-Reset (SR) latch 660, data multiplexer (or mux) 665, XOR-gate 670, XNOR-gate 675, and latches 680, 685, 690, and 695. As shown in FIG. 6, data merge unit 600 has two data input channels and one data output channel. In other embodiments, data merge unit 600 may have other numbers of data input channels. VC control signals (Credit_increment0 and Credit_increment1) may be received by data merge unit 600, one for each channel, to indicate that the output data has been received by the successor router and the VC credit has been released.

The mutex 605 may grant access to a shared resource (data register 695) to exactly one of two competing requests. In one embodiment, mutex 605 may be an analog arbiter circuit. The mutex 605 along with the two mutex input control units 610 and 615 may arbitrate between the two input requests from the two data input channels. The winner of arbitration will be allowed to transfer data to the output first, and the loser will be allowed to transfer data to the output next. The input latches 650 and 655 may normally be opaque (i.e., disabled). Only one of them can open at a time, after the mutex 605 decides the winner. The output latches 680, 685, and 690 and data register 695 are normally transparent (i.e., enabled) capture-pass latches. The output latches 680, 685, and 690 and data register 695 may be used for flow control. The acknowledgment latches 640 and 645 are normally transparent. The acknowledgment latches 640 and 645 allow the acknowledgements to be sent out at a safe timing. Full detector units 620 and 625, with one for each VC, may count the number of flits sent out for the corresponding VC, as well as the number of credits released by the successor router. Whenever the successor router has no credits available on a particular VC, the corresponding full detector unit 620 or 625 will assert the full signal (full0 or full1) to prevent any input requests from requesting the mutex 605 for that particular VC. At this moment, when a full detector unit 620 or 625 asserts the full signal, the corresponding timer unit 630 or 635 will be activated, to repeatedly check if a credit is released in the successor router. When one or more credits are available again, the full signal will be de-asserted by full detector unit 620 or 625, and the router will return to normal operation.

Mutex 605 may generate the "zerowins" signal when mutex input control unit 610 wins the arbitration, and mutex 605 may generate the "onewins" signal when mutex input control unit 615 wins the arbitration. The "zerowins" signal may be coupled to full detector unit 620 and to the enable signal of latch 650. When latch 650 is enabled in response to "zerowins" being asserted by mutex 605, the input data request (Reqin0) may be allowed to pass through latch 650 to latch 685. Latch 685 may normally be transparent with the enable signal for latch 685 generated by XNOR-gate 675. XNOR-gate 675 may also generate the enable signal for latches 685 and 690 and register 695. The inputs to XNOR-gate 675 may be the Q output of latch 680 and the acknowledge input signal (Ackin) from the neighboring router or node. The Q output of latch 650 and the Q output of latch 655 may be coupled to the inputs of XOR-gate 670. Accordingly, the output of XOR-gate 670 will be high whenever one of the input data request signals is allowed to pass through latch 650 or latch 655 when the mutex 605 has selected a winner of arbitration. The output of XOR-gate 670 may be coupled to the D input of latch 680.

The credit increment signals (Credit_increment0 and Credit_increment1) may be coupled to corresponding full detector units 620 and 625. Full detector units 620 and 625 may maintain counters to track the number of credits released by the successor router or node on VCs 0 and 1, respectively. Full detector units 620 and 625 may also maintain counters to track the number of data request arbitrations won by VC 0 and VC 1, respectively. When a data request wins arbitration, the corresponding full detector unit may perform a comparison of the credits released counter to the data request arbitrations won counter. If the data request arbitrations won counter is greater than the credits released counter, then the full detector unit may generate the full signal which is conveyed to the corresponding mutex input control unit.

Figure 7:
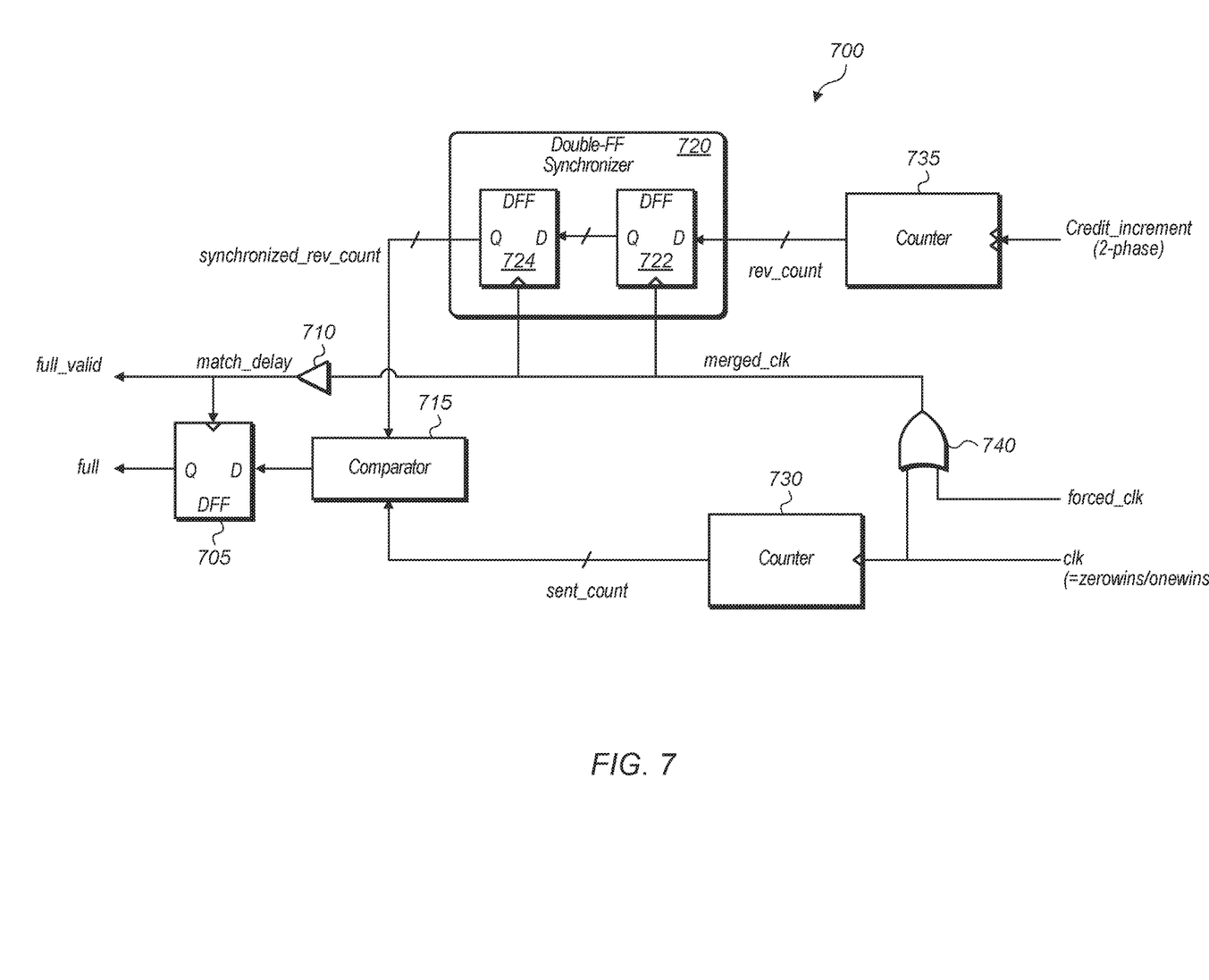
FIG. 7 is a block diagram of one embodiment of a full detector unit.

Referring now to FIG. 7, a block diagram of one embodiment of a full detector unit 700 is shown. In one embodiment, there may be two full detector units in a data merge unit (e.g., data merge unit 600 of FIG. 6), with one full detector unit for each VC. In other embodiments, there may be other numbers of full detector units depending on the number of VCs. Full detector unit 700 may be configured to detect a potentially full status of the input buffer for the corresponding VC in the successor router. If the input buffer is potentially full, full detector unit 700 may generate a full indication for the corresponding mutex input control unit (e.g., mutex input control unit 610 or 615), and the mutex input control unit may then prevent any further requests from being asserted for that VC.

In one embodiment, full detector unit 700 may include two counters which are shown as counter 730 and counter 735. Counter 730 may be referred to as the "send counter" and counter 735 may be referred to as the "receive counter". Counter 730 may count the number of flits sent out to the output channel for the corresponding VC. Counter 730 may be incremented whenever the data request on the corresponding VC wins arbitration from the mutex (e.g., mutex 605). In one embodiment, counter 730 may be a Gray code counter which is positive edge triggered. In other embodiments, counter 730 may be any of various other types of counters. The input to counter 730 may be the clock (or clk) signal from the corresponding zerowins or onewins arbitration signal. Counter 730 may be incremented each time a pulse is generated on the clock signal.

Counter 735 may count the number of credits released by the successor router. Counter 735 may be incremented whenever a flit leaves the input buffer, or an entry in the input buffer is otherwise freed, in the successor router. In one embodiment, counter 735 may be a Gray code counter which is double triggered. In other embodiments, counter 735 may be any of various other types of counter. The input to counter 735 may be the credit_increment signal from the successor router. In one embodiment, the credit_increment signal may be a two-phase signal.

Comparator 715 may compare the two counts generated by counters 730 and 735 and determine if the input buffer in the next router is potentially full based on a result of the comparison. The comparison may be performed each time that the send counter 730 is updated. Since updates of the receive counter 735 are not synchronized with the send counter 730, full detector unit 700 may include synchronizer 720 to synchronize the output (or rev_count) of the receive counter 735 with the output (or sent_count) of the send counter 730. In one embodiment, the receive counter 735 may be implemented as a Gray code counter to ensure that at most one bit in rev_count can go into metastability. After the metastability is resolved, rev_count will either be the newest value or an older counter value from one cycle before.

In one embodiment, counter 730 may be initialized to zero and counter 735 may be preset to a value equal to the size of the successor router's input buffer in units of flits. In this embodiment, comparator 715 may compare counter 730 to counter 735 and if counter 730 is greater than or equal to counter 735, then comparator 715 may generate the full signal. In another embodiment, both counter 730 and 735 may be initialized to zero, and comparator may compare counter 730 to the sum of counter 735 and the size of the successor router's input buffer. In this embodiment, if counter 730 is greater than or equal to the sum of counter 735 and the input buffer size, then comparator 715 may generate the full signal. In other embodiments, other suitable types of comparisons may be performed to determine if the input buffer in the successor router is potentially full.

Synchronizer 720 may include D-flip-flops 722 and 724, and the output of synchronizer 720 is labeled as synchronized_rev_count which is coupled to comparator 715. The input clock, which is the zerowins or onewins signal generated by the mutex, may be coupled to an input of OR-gate 740. The corresponding forced_clk signal from a timer unit (e.g., timer unit 630 or 635) may be coupled to another input of OR-gate 740. The output of OR-gate 740 is labeled as "merged_clk" which may be coupled to the delay element 710, with the output of delay element 710 labeled as "match_delay", which may be coupled to the clock input of D-flip-flop 705. The output of delay element 710 may also be coupled to a timer unit as the full_valid signal. The output of comparator 715 may be coupled to the D input of D-flip-flop 705, and the Q output of D-flip-flop 705 may be the full signal which is coupled to a corresponding mutex input control unit. In one embodiment, the full signal may utilize a 4-phase signaling protocol.

Figure 8:
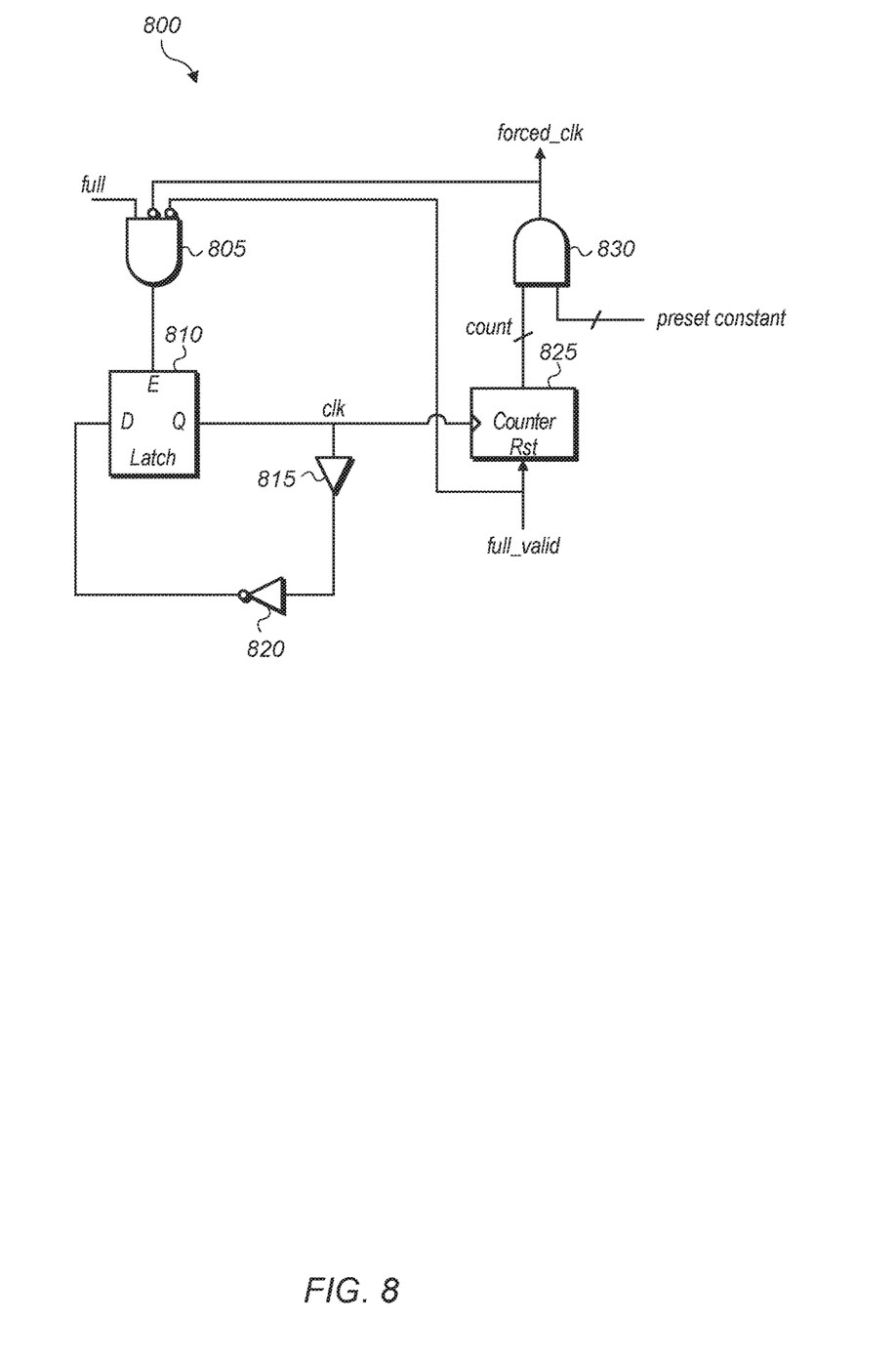
FIG. 8 is a block diagram of one embodiment of a timer unit.

Turning now to FIG. 8, a block diagram of one embodiment of a timer unit 800 is shown. In various embodiments, the logic of timer unit 800 may be included within timer units 630 and 635 of data merge unit 600 of FIG. 6. In one embodiment, timer unit 800 may only be activated when the full detector unit (e.g., full detector unit 700 of FIG. 7) detects a potentially full status. After timer unit 800 is activated, timer unit 800 may repeatedly trigger the corresponding full detector unit until one or more credits have been released in the successor router. The cycle time of triggering the full detector unit may be configured to any desired interval.

Timer unit 800 may include AND gate 805, latch 810, delay element 815, inverter 820, counter 825, and AND-gate 830. The full_valid signal generated by the full detector unit may be coupled to the reset input of counter 825. The full_valid signal may also be coupled to a negated input of AND-gate 805. The full signal generated by the full detector unit may also be coupled to another input of AND-gate 805.

The output count of counter 825 may be coupled to an input of AND-gate 830, while a preset constant may be coupled to the other input of AND-gate 830. When the output of counter 825 reaches the preset constant, then AND-gate 830 may generate a logical '1' output for the forced_clock signal which may be coupled to a negated input of AND-gate 805. The present constant may be programmable and its value may determine the frequency of the clock output (forced_clk) of AND-gate 830. The forced_clk signal may also be coupled to the OR-gate 740 in full detector unit 700 (of FIG. 7). The output of AND-gate 805 may be coupled to the enable input of latch 810. The Q output of latch 810 (which is labeled as "clk") may pass through a delay element 815 and inverter 820 and then may be coupled back to the D input of latch 810. The Q output of latch 810 may also be coupled to the clock input of counter 825.

Figure 9:
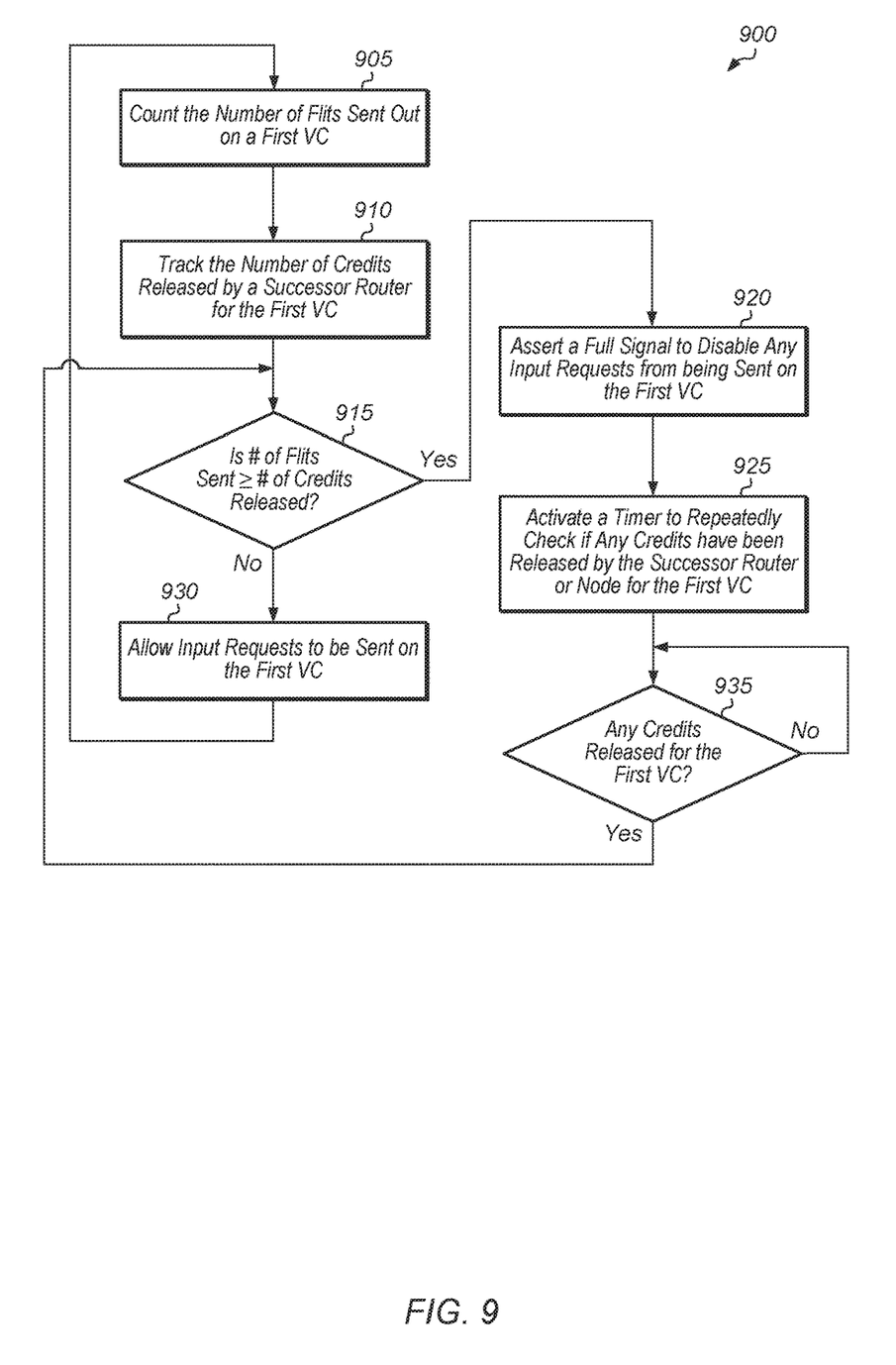
FIG. 9 is a generalized flow diagram illustrating one embodiment of a method for implementing a full detector unit of an asynchronous router.

Referring now to FIG. 9, one embodiment of a method 900 for implementing a full detector unit of a self-timed router is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various systems or processors described herein may be configured to implement method 900.

A full detector unit may count the number of flits sent out on a first virtual channel (VC) (block 905). In one embodiment, the full detector unit may be integrated within a data merge unit of an interface unit of a self-timed router. The full detector unit may utilize a first counter to count the number of flits sent out on a first virtual channel. The full detector unit may also track the number of credits released by a successor router for the first VC (block 910). It may be assumed for the purposes of this discussion that a credit is released for each flit received and passed through an input buffer of the successor router or node. The full detector unit may utilize a second counter to count the number of credits released by a successor router or node for the first VC. In one embodiment, the second counter may be initialized to a value equal to the size of the input buffer of the successor router in terms of the number of flits the input buffer can store. For example, if the input buffer can store four flits, then the second counter may be initialized to four.

If the number of flits sent out is greater than or equal to the number of credits released for the first VC (conditional block 915, "yes" leg), then a full signal may be asserted to disable any input data requests from being sent on the first VC (block 920). The full signal may prevent any input data requests from winning arbitration on the first VC. Also, a timer may be activated to repeatedly check if any credits have been released by the successor router or node for the first VC (block 925). If the number of flits sent out is less than the number of credits released for the first VC (conditional block 915, "no" leg), then input requests may be allowed to be sent on the first VC (block 930) and then method 900 may return to block 905. In embodiments where the second (or credits released) counter is not initialized to a value equal to the size of the input buffer in terms of flits, the comparison in conditional block 915 may compare the value of the first counter to a sum of the value of the second counter and the size of the input buffer in terms of flits. In other embodiments, other types of comparisons may be performed in conditional block 915 to determine if the input buffer of the successor router is potentially full.

After block 925, if any credits have been released by the successor router or node for the first VC (conditional block 935, "yes" leg), then method 900 may return to conditional block 915 to determine if the number of flits sent out is greater than the number of credits released for the first VC. If no credits have been released by the successor (conditional block 935, "no" leg), then method 900 may remain at conditional block 935. It is noted that there may be a separate full detector unit performing method 900 for each VC supported by the self-timed router. Accordingly, multiple instances of method 900 may be performed simultaneously by multiple different full detector units.

Figure 10:
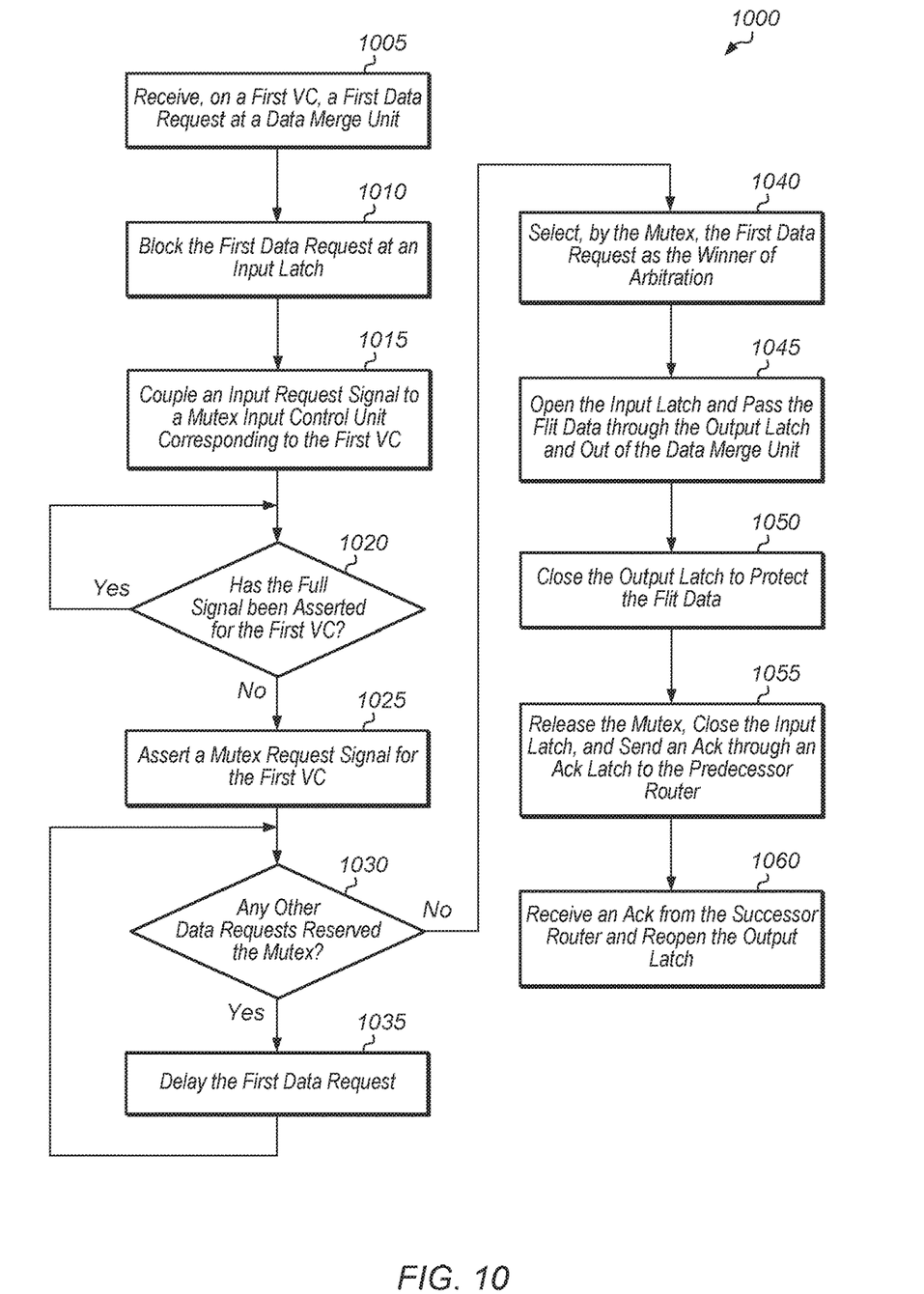
FIG. 10 is a generalized flow diagram illustrating another embodiment of a method for processing a data request.

Turning now to FIG. 10, one embodiment of a method 1000 for processing a data request is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various systems or processors described herein may be configured to implement method 1000.

A first data request may be received, on a first VC, at a data merge unit (block 1005). The data merge unit may detect the received first data request by detecting a toggling on an input request signal corresponding to the first VC. Next, the data request may be automatically blocked at an input latch (block 1010). An input request signal may be coupled to a mutex input control unit corresponding to the first VC (block 1015). If the full signal has not been asserted for the first VC (conditional block 1020, "no" leg), then in response to receiving the input request signal, the mutex input control unit may assert a mutex request signal for the first VC (block 1025). Otherwise, if the full signal has not been asserted for the first VC (conditional block 1020, "yes" leg), then method 1000 may remain at conditional block 1020.

If no other data requests have reserved the mutex (conditional block 1030, "no" leg), then the mutex may select the first data request as the winner of arbitration (block 1040). If another data request has already reserved the mutex and the mutex has not yet been released (conditional block 1030, "yes" leg), then the first data request may be delayed (block 1035). When the mutex selects the first data request as the winner of arbitration, the input latch may be opened and the flit data may pass through an output latch and be conveyed out of the data merge unit (block 1045). Once the flit data passes through the output latch, the output latch may be closed to protect the flit data (block 1050). After the flit data is sent out of the data merge unit through the output latch, the mutex input control component for the first input channel may release the mutex, the input latch may be closed, and an acknowledgment may be sent out through an acknowledgment latch to the predecessor router (block 1055). Next, an acknowledgement may be received from the successor router, which will reopen the output latch (block 1060). After block 1060, method 1000 may end.

Figure 11:
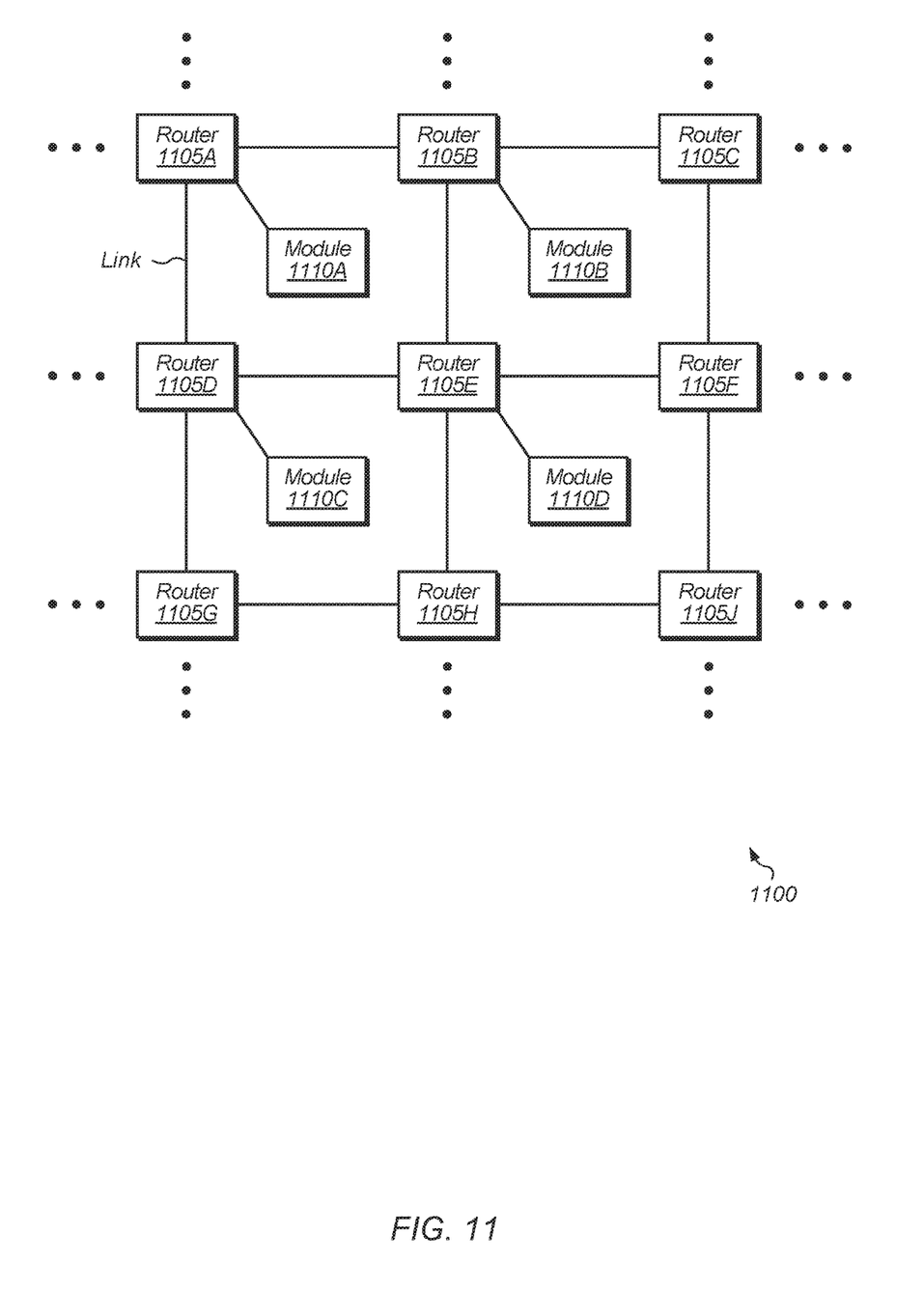
FIG. 11 is a block diagram of one embodiment of a computing system.

Referring now to FIG. 11, a block diagram of one embodiment of a computing system 1100 is shown. System 1100 may include a network on chip (NoC) mesh configuration of routers 1105A-J coupled to each other over a plurality of links. In various embodiments, system 1100 may be configured to process and store data, perform computational tasks, and transmit data to other devices and systems using one or more networks. In one embodiment, routers 1105A-J may be asynchronous routers which utilize self-timed mechanisms to coordinate the transfer of packets between adjacent routers or modules. For example, one or more of the routers 1105A-J may include the components and logic illustrated in FIGS. 2-8.

Routers 1105A, 1105B, 1105D, and 1105E may be coupled to modules 1110A-D, respectively. The term "module" may be used to refer to a computing node or memory node. More generally, the term "module" may also be used to refer to an adjacent router, switch, or other component coupled to routers 1105A-J. Routers 1105A-J are representative of any number and type of routers. Also, modules 1110A-D are representative of any number and type of modules. It should be understood that in other embodiments, other systems may have other arrangements of routers and modules, with different types of connections and/or different numbers of routers and modules.

In various embodiments, program instructions of a software application may be used to implement the methods and/or mechanisms previously described. The program instructions may describe the behavior of hardware in a high-level programming language, such as C. Alternatively, a hardware design language (HDL) may be used, such as Verilog. The program instructions may be stored on a non-transitory computer readable storage medium. Numerous types of storage media are available. The storage medium may be accessible by a computing system during use to provide the program instructions and accompanying data to the computing system for program execution. The computing system may include at least one or more memories and one or more processors configured to execute program instructions.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:
1. An asynchronous router comprising:
first circuitry comprising a first counter to count a number of flow control units (flits) that have been sent out from the asynchronous router on a first virtual channel (VC);
second circuitry comprising a second counter to count a number of credits that have been released from an adjacent module on the first VC, wherein a credit represents an availability of a resource in the adjacent module or authorization for the router to take an action; and wherein responsive to determining the first counter is greater than or equal to the second counter, the asynchronous router is configured to:
prevent a new flit from being sent on the first VC; and
generate a full indicator to prevent a request for arbitration from reaching a mutual exclusion element.

2. The asynchronous router as recited in claim 1, wherein:
the asynchronous router comprises a timer unit and a comparator;
the asynchronous router is configured to activate the timer unit responsive to generating the full indicator; and
the timer unit is configured to cause the comparator to compare the first counter to the second counter on an interval determined by the timer unit.

3. The asynchronous router as recited in claim 1, wherein the asynchronous router further comprises a comparator configured to perform a comparison of the first counter to the second counter in response to receiving a request to send a flit out on the first VC.

4. The asynchronous router as recited in claim 1, wherein:
the asynchronous router is configured to increment the second counter responsive to receiving a credit increment from the adjacent module; and
the second counter is incremented without performing a check of the first counter.

5. The asynchronous router as recited in claim 1, wherein:
the asynchronous router supports a plurality of VCs;
the asynchronous router comprises a pair of counters for each VC; and
the adjacent module is another asynchronous router.

6. The asynchronous router as recited in claim 1, wherein:
the asynchronous router further comprises a synchronizer; and
an output of the second counter is conveyed to the synchronizer prior to being compared to an output the first counter.

7. A system comprising:
a plurality of asynchronous routers; and
a computing module;
wherein a first asynchronous router comprises:
a first counter to count a number of flow control units (flits) that have been sent out from the first asynchronous router on a first virtual channel (VC); and
a second counter to count a number of credits that have been released from an adjacent module on the first VC, wherein a credit represents an availability of a resource in the adjacent module or authorization for the router to take an action;
wherein responsive to determining the first counter is greater than or equal to the second counter, the first asynchronous router is configured to:
prevent a new flit from being sent on the first VC; and
generate a full indicator to prevent a request for arbitration from reaching a mutual exclusion element.

8. The system as recited in claim 7, wherein:
the first asynchronous router comprises a timer unit and a comparator;
the first asynchronous router is configured to activate the timer unit responsive to generating the full indicator; and
the timer unit is configured to cause the comparator to compare the first counter to the second counter on an interval determined by the timer unit.

9. The system as recited in claim 7, wherein the first asynchronous router further comprises a comparator configured to perform a comparison of the first counter to the second counter in response to receiving a request to send a flit out on the first VC.

10. The system as recited in claim 7, wherein:
the first asynchronous router is configured to increment the second counter responsive to receiving a credit increment from the adjacent module; and
the second counter is incremented without performing a check of the first counter.

11. The system as recited in claim 7, wherein:
the first asynchronous router supports a plurality of VCs;
the first asynchronous router comprises a pair of counters for each VC; and
the adjacent module is a second asynchronous router.

12. The system as recited in claim 7, wherein:
the first asynchronous router further comprises a synchronizer; and
an output of the second counter is conveyed to the synchronizer prior to being compared to an output the first counter.

13. A method comprising:
maintaining a first counter to count a number of flow control units (flits) that have been sent out from an asynchronous router on a first virtual channel (VC);
maintaining a second counter to count a number of credits that have been released from an adjacent module on the first VC, wherein a credit represents an availability of a resource in the adjacent module or authorization for the router to take an action; and
responsive to determining the first counter is greater than or equal to the second counter:
preventing a new flit from being sent on the first VC; and
generating a full indicator to prevent a request for arbitration from reaching a mutual exclusion element.

14. The method as recited in claim 13, further comprising:
activating a timer unit responsive to generating the full indicator; and
causing a comparator to compare the first counter to the second counter on an interval determined by the timer unit.

15. The method as recited in claim 13, further comprising performing a comparison of the first counter to the second counter in response to receiving a request to send a flit out on the first VC.

16. The method as recited in claim 13, further comprising incrementing the second counter responsive to receiving a credit increment from the adjacent module, wherein the second counter is incremented without performing a check of the first counter.

17. The method as recited in claim 13, wherein:
the asynchronous router supports a plurality of VCs;
the asynchronous router comprises a pair of counters for each VC; and
the adjacent module is another asynchronous router.

* * * * *